Jan. 3, 1939.                H. F. LINKER                2,142,949
FOLDING STEP
Filed Oct. 5, 1937
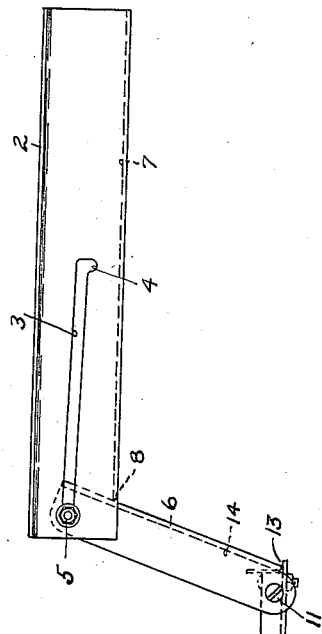
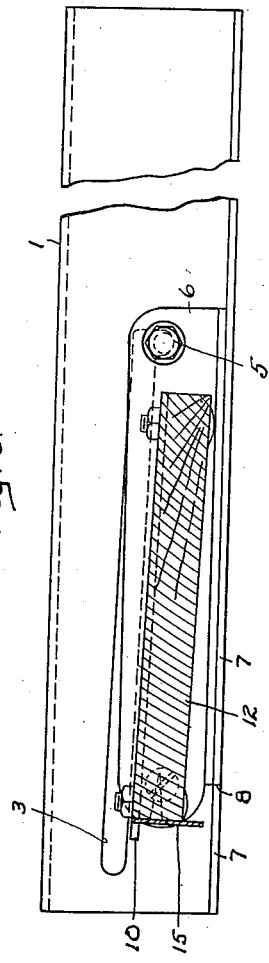
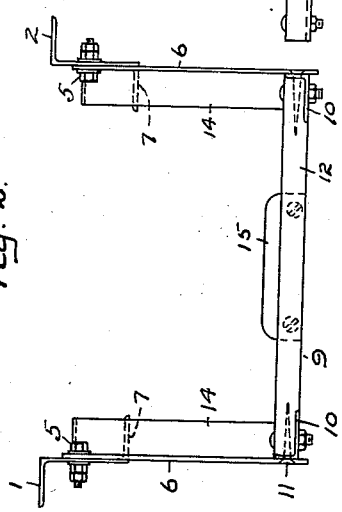
H. F. Linker
INVENTOR.
BY
ATTORNEY.

Patented Jan. 3, 1939

2,142,949

UNITED STATES PATENT OFFICE 2,142,949

FOLDING STEP

Henry F. Linker, Fort Wayne, Ind.

Application October 5, 1937, Serial No. 167,408

3 Claims. (Cl. 280—166)

The invention relates to folding steps, especially for trailers and other vehicles.

The object of the invention is to provide a simple, durable step which when folded occupies a minimum of space and when extended remains fixed and rigid against unintentional closing or folding.

The invention is illustrated in the accompanying drawing in which

Figure 1 is a side view of the step in extended position.

Fig. 2 is a front elevation of the same and

Fig. 3 is a longitudinal cross-section of the step in folded condition.

Referring to the illustrative drawing 1, 2 are two Z bars adapted to be secured to the lower side of the vehicle or other object and preferably entirely within the margin of said side. A slot 3 is formed in the upright wall of each bar, the forward end of the slot being adjacent, preferably, to the forward end of the Z bar. Each slot declines from its forward end and a notch 4 is formed in the lower edge of each slot at its inner end. A bolt 5 extends through each slot and loosely through the upright wall of an angle bar 6 so that the angle bars 6 are pivotally mounted on the adjacent Z bars and above the lower inwardly projecting flanges 7 or the Z bars. The forward portion of each flange 7 is cut away to form a shoulder 8 against which the angle bar 6 will abut when the step is extended as shown in Figures 1, 2.

A step 9, preferably consists of two angle bars 10 pivoted at 11 to the lower end of the angle bars 6 respectively and a tread 12 secured to the bars 10. The transverse flange 13 of each bar 10 projects beyond the tread and is adapted to engage under the end of the transverse flange 14 of the angle bars 6 respectively when the step is extended.

A plate 15 is secured to the rear wall of the tread 12 and projects above the tread. This plate serves as a means to facilitate the withdrawal of the step from folded position and also as a scraper on which the user may remove mud and other matter from his shoes.

As shown in Figure 1, the step is in extended position. The bolts 5 are at the forward end of the slots 3, the transverse flanges of the angle bars 6 contact the shoulders 8 on the ends of the and the bars 10 engage under the ends of the flanges 14 of the angle bars 6. The step is now rigidly supported and locked against rearward movement should it be bumped accidentally by a person in the act of stepping onto it.

To fold the step the tread is turned upwardly on its pivots 11 and moved into the angle bars 6. This folded unit is then raised on the bolts to a horizontal position and moved inwardly, the bolts 5 sliding in the slots 3 to the inner end thereof and dropping into the notches 4. The bars 6 and the folded unit is thereby supported on said flanges and it is locked against unauthorized withdrawal by the bolts which engage in the notches 4. Since the slots 3 are declined inwardly the folded unit tends to remain in its innermost position under the influence of gravity and is not dislodged under the usual movements of the vehicle or other object to which it is attached.

To extend the step the forward end of the folded unit is raised and upon drawing the unit forwardly the bolts 5 will readily move out of the notches 4 and through the slots 3 to the forward end thereof. The unit is then lowered and the tread turned to horizontal position.

What I claim is:

1. A folding step comprising a pair of laterally spaced supports each having a declined longitudinal slot therein and a transverse flange thereon below the slot, two members pivotally and slidably mounted in the slots respectively, a tread mounted on the said members and foldable thereon into substantial parallel relation thereto, the folded unit of tread and said members being adapted to be moved in said slots into retracted position on the transverse flanges of the supports and means to lock the unit in retracted position and comprising a notch in the lower edge of each slot at the inner end thereof to receive the pivots of the pivotally and slidably mounted members.

2. A folding step comprising a pair of laterally spaced Z bars having their lower lateral flanges opposing one another, each bar having a declined longitudinal slot therein, a pair of supports pivotally and slidably mounted in the said slots respectively, a tread mounted on the supports and foldable thereon into substantial parallel relation thereto, rearwardly extending projections on the tread to engage the ends of the supports respectively to retain the tread in horizontal position when the step is extended, the folded unit of tread and supports being slidable in the said slots into retracted position supported by the said opposed flanges of the Z bars, each of the slots having a notch in its lower edge adjacent the inner end thereof to receive the pivots of the supports.

3. A folding step comprising a pair of supports having upright walls and opposed transverse walls, the upright walls having rearwardly declined slots therein above the transverse walls, a pair of angle bars pivotally and slidably supported at one end in the slots respectively, a tread pivotally mounted on the opposite end of the angle bars respectively and adapted to fold into the angles of said bars, rearwardly extending projections on the tread adapted to abut the ends of the angle bars to retain the tread in horizontal position when the step is extended, shoulders on the supports adapted to be engaged by the angle bars to limit rearward movement of said bars when the step is extended, the transverse walls of the supports supporting the folded step when the pivoted points of the angle bars are moved rearwardly in the declined slots and notches in the upright walls of the Z bars to receive the pivots of the supports for locking the folded step at the inner or rear end of said slots.

HENRY F. LINKER.